United States Patent

Fuzisawa et al.

[11] 4,083,144
[45] Apr. 11, 1978

[54] **METHOD FOR CULTIVATION OF *LENTINUS EDODES***

[75] Inventors: Noriyoshi Fuzisawa, Sakura; Akio Maedai, Funabashi; Kenichi Hattori, Musashino, all of Japan

[73] Assignee: Kao Soap Co., Ltd., Tokyo, Japan

[21] Appl. No.: 794,100

[22] Filed: May 5, 1977

[30] Foreign Application Priority Data

May 24, 1976 Japan .................................. 51-59815

[51] Int. Cl.² ............................................... A01G 1/04
[52] U.S. Cl. ...................................................... 47/1.1
[58] Field of Search ............................................ 47/1.1

[56] References Cited

FOREIGN PATENT DOCUMENTS 4,927,774  7/1974  Japan ........................................ 47/1.1

Primary Examiner—Robert E. Bagwill
Attorney, Agent, or Firm—Blanchard, Flynn, Thiel, Boutell & Tanis

[57] ABSTRACT

*Lentinus edodes* is artificially cultivated by inoculating an artificial solid granular or fibrous culture medium with fungus seed of *Lentinus edodes*, cultivating the bed to generate hyphae on the surface thereof, covering localized areas of said surface with an air-permeable coating material before said hyphae become brown, continuing cultivation of said bed to cause the uncovered hyphae to become brown and then subjecting the bed to mushroom-growing conditions.

8 Claims, 5 Drawing Figures

METHOD FOR CULTIVATION OF LENTINUS EDODES

BACKGROUND OF THE INVENTION

1. Field of the Invention

The present invention relates to a method for the artificial cultivation of *Lentinus edodes* by using an artificial solid culture medium (hereinafter referred to as "cultural medium"), in which *Lentinus edodes* can successfully be harvested in a short time in large quantities.

2. Description of the Prior Art

In general, *Lentinus edodes* has heretofore been cultivated by the so-called bed log cultivation method using raw wood. However, since this bed log cultivation method is a natural cultivation method in which a long time, such as about 1.5 years, is required from the time of inoculation of the fungus seed to generation of a fruit body, the cultivation results are inevitably influenced by weather conditions and are very erratic. Further, the cultivation is often inhibited by injurious fungi and the harvest is frequently reduced by such damage. Furthermore, the price of raw wood is increasing because of the shortage thereof and the problem of the shortage of manpower in rural and mountain districts is becoming serious.

Accordingly, it has been desired to develop a method of cultivating *Lentinus edodes* in which raw wood is not used and a good harvest can be obtained on a regular and stable basis in a relatively short time without the need for extensive manual labor. However, an artificial cultivation method comparable to the bed leg cultivation method from the economic viewpoint was not found, prior to our invention. More specifically, various methods for artificially cultivating *Lentinus edodes* have heretofore been proposed, but they are defective in that a long time is required for cultivation and very complicated operations must be performed. Moreover, it often happens that no fruit bodies grow at all or if fruit bodies grow, the harvest thereof is small and most of the fruit bodies are deformed and have low commercial value. Therefore, the prior methods are not suitable as a technique for replacing the bed log cultivation method.

In contrast, for cultivation of other mushrooms such as *Pholiota nameko* and *Pleurotus ostreatus*, artificial methods are mainly used in place of the bed log cultivation method. If *Lentinus edodes* is cultivated following the artificial cultivation methods used for cultivating these other mushrooms, economical results cannot substantially be expected, apparently because the biological properties of *Lentinus edodes* are significantly different from those of *Pholiota nameko, Pleurotus ostreatus* and the like.

When the state of growth of *Lentinus edodes* in the bed log cultivation method is carefully examined, it is seen that, as shown in FIG. 1, most of the fruit bodies 3 grow from the bark face 1 and in general, fruit bodies do not grow from the cut end 2. In contrast, in the bed log cultivation of *Pholiota nameko* and *Pleurotus ostreatus*, fruit bodies grow well not only from the bark face but also from the cut end. It is considered that in case of *Lentinus edodes*, differentiation of hyphae to fruit bodies takes place only on the bark face, but in the case of *Pholiota nameko* and *Pleurotus ostreatus*, differentiation is possible if only hyphae grow and gather. That is, *Lentinus edodes* is substantially different from *Pholiota nameko, Pleurotus ostreatus* and the like with respect to differentiation of hyphae to fruit bodies. Accordingly, it is considered that *Pholiota nameko, Pleurotus ostreatus* and the like grow even on the surface of a culture medium which is not equivalent to the bark face of a log (namely, under the same conditions as those on the cut end of the log), but *Lentinus edodes* scarcely grows from the surface of such a culture medium. According to various artificial cultivation methods heretofore proposed, it is intended to cause fruit bodies of *Lentinus edodes* to grow, contrary the effects of nature, on the surface of a culture medium where spontaneous growth of fruit bodies is substantially difficult and therefore, a long time is required for cultivation, deformed fruit bodies are obtained and other serious defects occur.

As regards the role of the bark in the bed log cultivation of *Lentinus edodes*, there have been proposed various theories, for example, a theory of catalytic stimulus, a theory of nourishment and a theory of pressure stimulus. We have departed from these theories and, as a result of our studies, we have arrived at the conclusion that the bark has the role of adjusting the amount of air that permeates into the places where the rudiments of the *Lentinus edodes* fruit bodies form (namely, the zone between the bark and the xylem).

SUMMARY OF THE INVENTION

Based on the above discovery concerning the biological properties of *Lentinus edodes* and the role of the bark of the bed log, and with a view to developing a method for artificial cultivation of *Lentinus edodes*, we have discovered that when *Lentinus edodes* is cultivated in a culture medium containing nutriments suitable for the growth of hyphae of *Lentinus edodes*, such as sawdust, bagasse, rice hulls, rice bran and wheat bran, if there is additionally used a coating material which is not decomposed or utilized by *Lentinus edodes* and which is air permeable, such as a polyethylene film, a polyvinyl chloride film, a polypropylene film, a polycarbonate film or a polystyrene film, as a bark substitute for controlling the air permeation, and that coating material is locally applied to the surface of the culture medium that has direct contact with air (the mushroom-growing surface described hereinafter) and, further, a fruit body-generating treatment such as a low temperature treatment is then carried out, fruit bodies of *Lentinus edodes* can reliably be generated in large quantities in a short time from the place or places to which the coating material is applied, regardless of the cultivation method used, i.e., the bottle, vat or bag cultivation method. Based on this discovery, we have now completed the present invention.

According to our experiments, it has been confirmed that if a culture medium having a culturing environment equivalent to that of the bark face of a bed log is used, large quantities of fruit bodies of *Lentinus edodes* can easily and reliably be obtained in a short time period of about 40 to about 70 days, similar to the case of *Pholiota nameko, Pleurotus ostreatus* and the like, and that since the cultivation method is in good accord with the natural growth requirements, deformation of fruit bodies does not occur at all and the fruit bodies obtained are excellent in shape and color. Thus, according to the present invention, there is attained the surprising effect that all of the disadvantages of the conventional methods for artificial cultivation of *Lentinus edodes* are completely overcome and eliminated.

The present invention will now be described in greater detail by reference to the accompanying drawings.

Any nutriments suitable for the growth of hyphae of *Lentinus edodes*, such as sawdust, bagasse, rice hulls, rice bran and wheat bran, can be used as the fundamental nutritive component of the culture medium in the present invention. These nutriments can be used singly or mixtures of two or more of them can be used. The optimum water content of the culture medium is 65 to 75 wt.%. The time for applying the coating material to the culture medium is not particularly critical. It can be applied before sterilization of the culture medium (namely, before inoculation of the fungus seed) or after inoculation of the fungus seed. When the coating material is applied after inoculation of the fungus seed, for the reasons set forth hereinafter, it is preferred that the coating material be applied within about 20 days from the date of inoculation of the fungus seed in the culture medium.

The place for applying the coating material to the medium will now be described by reference to the accompanying drawings.

Figure 1:
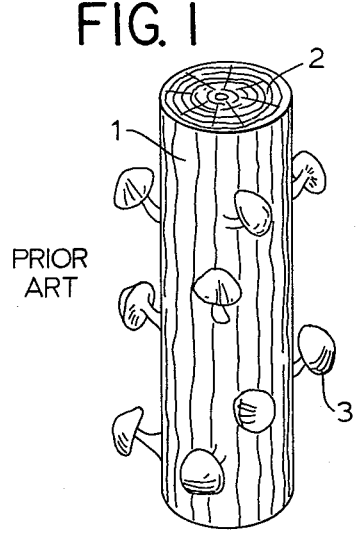
FIG. 1 illustrates the prior art bed log cultivation of *Lentinus edodes*.
Figure 2:
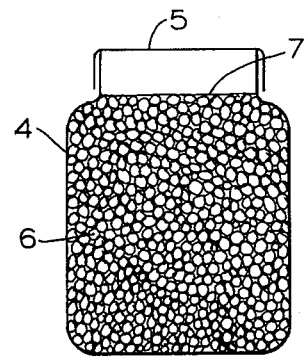
FIG. 2 illustrates one embodiment of apparatus for the artificial cultivation of *Lentinus edodes*, according to the invention.
Figure 3:
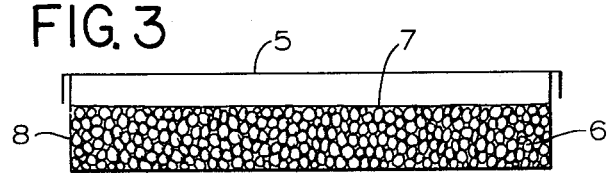
FIG. 3 illustrates another embodiment of the invention.
Figure 4:
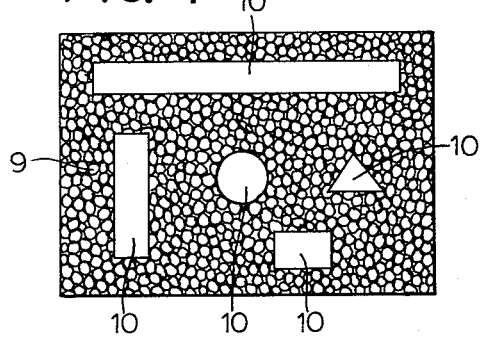
FIG. 4 is a top view of FIG. 3.

In case of bottle cultivation, as illustrated in FIG. 2, using a wide-mouthed bottle 4 filled with a culture medium 6 and sealed with a lid 5 for preventing intrusion of miscellaneous fungi and bacteria, or in case of the vat cultivation using a vat 8 as shown in FIG. 3, instead of a bottle, a coating material 10 is applied so as to contact localized spaced-apart areas of the exposed mushroom-growing surface 7 as shown in FIG. 4. In case of bag cultivation, the coating material is applied in a similar manner. As shown in FIG. 4, in general, the coating material 10 to be applied has an area smaller than the area of the exposed mushroom-growing surface, but the numbers and shapes of the coating material pieces are not particularly critical. Further, when a coating material having an area substantially equal to that of the exposed mushroom-growing surface of the culture medium is applied so that it contacts localized spaced-apart areas of the mushroom-growing surface, good results can similarly be obtained. For example, there can be used a coating material in the form of a single sheet having cut-out areas. Accordingly, all of these manners of application of the coating material 10 are included within the scope of the present invention.

Figure 5:
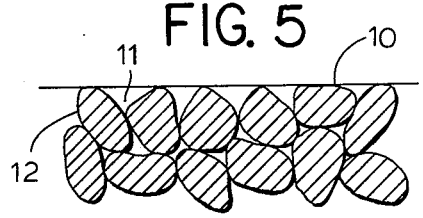
FIG. 5 is an enlarged sectional view through a piece of coating material on the culture medium.

If cultivation is carried out at, for example 25° C, in the above-mentioned culture medium, within about 20 days, hyphae cover all the exposed mushroom-growing surface except the area to which the coating material has been applied, and the hyphae per se form soft membranes 9 and slight browning begins and in about 30 days the system becomes blackish-brown. Since the culture medium is principally a granular or fibrous substance 12 composed of sawdust, bagasse, rice hulls, rice bran and wheat bran, small spaces 11 are present here and there between the pieces of culture medium and the coating material 10 as shown in FIG. 5. But with the growth of hyphae, these clearance spaces become filled with hyphae and such clearance spaces finally disappear. Browning does not take place in hyphae which are located directly below the coating material. It is important to note that when, after 40 to 70 days' cultivation of hyphae, a mushroom-growing treatment, such as a low temperature treatment, is carried out, fruit bodies grow only from hyphae located directly below the coating material in which browning has not taken place. Fruit bodies grow from browned hyphae only after the mushroom-growing treatment is carried out after 4 to 6 months' cultivation of such hyphae. Accordingly, when the coating material is applied after inoculation of the fungus seed, as pointed out hereinbefore, it is preferred that the coating material be applied prior to browning of hyphae on the mushroom-growing surface, namely within about 20 days from inoculation of the fungus seed. If the coating material is applied to the portion after browning of hyphae has already taken place, no substantial effect can be attained.

After cultivation of hyphae has been continued at 25° C for 40 to 70 days, a mushroom-growing treatment, such as a low temperature treatment at 15° to 20° C, is conducted. The coating material can be removed simultaneously with initiation of the mushroom-growing treatment, or it may be left in place on the culture medium. In the former case, fruit bodies promptly grow from the place where the coating material had previously contacted with the mushroom-growing surface. in the latter case, fruit bodies grow and they lift the coating material at the place where the coating material is in contact with the mushroom-growing surface. The coating material can be removed at this time. In each case, a great number of fruit body-forming rudiments are formed within 2 to 4 days from initiation of the mushroom-growing treatment and after passage of another 4 to 5 days, fruit bodies having the normal shape and color inherent of *Lentinus edodes* are formed.

The coating material having very advantageous effects in the above cultivation of *Lentinus edodes* will now be described in more detail.

As the coating material, there are most preferably used films of synthetic resins such as polyethylene, polyvinyl chloride, polypropylene, polystyrene and polycarbonate and copolymers and blends thereof, each of which has an air permeability and is not decomposed or utilized by hyphae of *Lentinus edodes*. The air permeability is influenced by the thickness of the film, but the film thickness is not particularly critical in the present invention. However, in case of a synthetic resin film as mentioned above, it is preferred that the thickness be in the range of 20 to 200 $\mu$. When a film having a higher air permeability is employed, the thickness can be increased beyond the above preferred range. When a glass sheet, an aluminum plate or a synthetic resin plate having no air permeability is used, no effect can be attained at all. Further, no effect can be attained by the use of paper, cellophane and the like because they are decomposed and utilized by hyphae of *Lentinus edodes*. The size of the coating material is not particularly critical, but good results are obtained when a circular coating material having a diameter not larger than 3 cm or a coating material having a shape of a strip having a width not larger than 3 cm is used. This limitation is based on the experimental finding that fruit bodies of *Lentinus edodes* rapidly grow mainly from non-browned white hyphae below the coating material which are spaced from browned hyphae by a distance of from 1.0 to 1.5 cm. Accordingly, it is not advantageous to use a coating material which is too wide because such will form large areas of non-browned white hyphae. When it is desired to generate a large number of fruit bodies on one culture medium, it is recommended to apply a great number of coating materials, each having the above-mentioned size.

As pointed out hereinbefore, various attempts have heretofore been made to artificially cultivate *Lentinus edodes* using a culture medium, but because it was not known, prior to this invention, to use a coating material such as mentioned above, in these known methods the mushroom-growing surface is entirely browned. This browned mushroom-growing surface has environmental conditions which are quite different from those of the bark face in the bed log cultivation, and therefore, fruit bodies of *Lentinus edodes* will not reliably grow from such browned mushroom-growing surface within 40 to 70 days. If a long mushroom-growing period, such as 4 to 6 months, has passed, fruit bodies will sometimes grow from such browned mushroom-growing surface but in many cases, no fruit bodies grow. Further, most of the fruit bodies growing from such browned mushroom-growing surface are deformed and have an abnormal shape.

In contrast, according to the present invention, by the very simple operation of applying the coating material to the mushroom-growing surface, fruit bodies of *Lentinus edodes* grow in as short a period as 40 to 70 days, in a large quantity, such as 20 to 25 wt.% based on the weight of the culture medium, reliably and with good reproducibility. Further, these fruit bodies have the same shape and color as the shape and color of the fruit bodies of bed log-cultivated *Lentinus edodes*. Thus, the present invention achieves economical artificial cultivation of *Lentinus edodes* which has heretofore been impossible according to the conventional techniques and the invention provides a very advantageous method for artificially cultivating *Lentinus edodes* which will replace the bed log cultivation method. Accordingly, the present invention makes a great contribution to the mushroom producing industry.

The present invention will now be further described by reference to the following illustrative Examples that by no means limit the scope of the invention.

EXAMPLE 1

A composition comprising 13.4 parts by weight of sawdust, 1.7 parts by weight of defatted rice bran and 16.2 parts of water was mixed to form a homogeneous culture medium, and 800 g of the thus-formed culture medium was packed in a rectangular vat having a width of about 25 cm, a length of about 16 cm and a height of about 8 cm. In this case, the height of the bed of the culture medium was about 4.5 cm. A lid composed of a polypropylene film (having a thickness of 30 $\mu$) was fixed to the vat in order to prevent the intrusion of contaminating bacteria and fungi, and the vat was subjected to pressure steam sterilization at 121° C under a pressure of 1.2 Kg/cm$^2$ for 2 hours. After cooling, the fungus seed of *Lentinus edodes* was inoculated on the culture medium and cultivation was carried out at 25° C. After 18 days, hyphae of *Lentinus edodes* covered entirely the mushroom-growing surface, but browning of the hyphae had not yet taken place. At this point, three polyethylene films, each having a length of 20 cm, a width of 3 cm and a thickness of 40 $\mu$, were applied, under sterile conditions, equidistantly spaced from each other, onto the mushroom-growing surface of the culture medium. The cultivation was further continued at 25° C for 27 days. Hyphae below the coating material on the mushroom-growing surface were not browned but stayed white, but hyphae in the other portions of the mushroom-growing surface were browned. After the cultivation, a low temperature treatment was carried out at 15° C for 3 days. At this time, there was observed the formation of rudiments of mushrooms only from hyphae located directly below the coating material. The coating material was removed. After the passage of another 5 days, complete fruit bodies of *Lentinus edodes* were formed. The quantity of the thus-formed fruit bodies is shown in Table 1. In Table 1, the comparative run refers a test wherein the same operations were conducted except that a coating material was not applied.

With respect to each run of the present invention and the comparative runs, the cultivation was simultaneously conducted on 5 culture media. In the runs of the present invention, 12 fruit bodies on the average grew on each culture medium and the average weight of the fruit bodies growing on one culture medium was 170 g. In contrast, in the comparative run, the mushroom-growing surface was entirely brown and formation of fruit bodies was not observed at all in any of the culture media.

EXAMPLE 2

By using a culture medium having a composition of 10.7 parts by weight of sawdust, 1.2 parts of potato starch dregs, 2.3 parts of defatted rice bran and 17.2 parts of water, the cultivation was conducted under the same conditions as described in Example 1 except that a polypropylene film having a thickness of 50 $\mu$ was used as the coating material and it was applied onto the mushroom-growing surface before the sterilization of the culture medium and it was removed at the start of the mushroom-growing treatment. The results obtained are shown in Table 1. Also in this Example, it was confirmed that a very advantageous effect was attained by the use of the coating material.

Table 1

| | | Amounts of Fruit Bodies Formed | | | |
|---|---|---|---|---|---|
| | | Example 1 | | Example 2 | |
| Run | Culture Medium No. | Number of Fruit Bodies Formed | Total Amount (g) of Fruit Bodies Formed | Number of Fruit Bodies Formed | Total Amount (g) of Fruit Bodies Formed |
| Runs of Present Invention (coating material was applied according to method of present invention) | 1 | 10 | 174 | 11 | 172 |
| | 2 | 12 | 160 | 10 | 171 |
| | 3 | 13 | 170 | 14 | 187 |
| | 4 | 10 | 163 | 12 | 169 |
| | 5 | 14 | 190 | 10 | 161 |
| Comparative Runs (coating material was not applied) | 1 | 0 | 0 | 0 | 0 |
| | 2 | 0 | 0 | 0 | 0 |
| | 3 | 0 | 0 | 0 | 0 |

Table 1-continued

| | | Amounts of Fruit Bodies Formed | | | |
|---|---|---|---|---|---|
| | | Example 1 | | Example 2 | |
| Run | Culture Medium No. | Number of Fruit Bodies Formed | Total Amount (g) of Fruit Bodies Formed | Number of Fruit Bodies Formed | Total Amount (g) of Fruit Bodies Formed |
| | 4 | 0 | 0 | 0 | 0 |
| | 5 | 0 | 0 | 0 | 0 |

EXAMPLE 3

A composition comprising 13.4 parts by weight of sawdust, 1.7 parts by weight of defatted rice bran and 16.2 parts by weight of water was mixed to form a homogeneous culture medium, and 800 g of the thus-formed culture medium was packed in a rectangular vat having a width of about 25 cm, a length of about 16 cm and a height of about 8 cm. In this case, the height of the bed of the culture medium was about 4.5 cm. A lid composed of a polypropylene film (having a thickness of 30 $\mu$) was fixed to the vat in order to prevent intrusion of miscellaneous bacteria and fungi, and the vat was subjected to the pressure steam sterilization at 121° C under a pressure of 1.2 Kg/cm$^2$ for 2 hours. After cooling, the fungus seed of *Lentinus edodes* was inoculated on the culture medium and cultivation was carried out at 25° C. After 18 days, hyphae of *Lentinus edodes* covered entirely the mushroom-growing surface but browning had not yet taken place. At this point, three polyethylene films, each having a length of 20 cm, a width of 3 cm and a thickness of 40 $\mu$, were applied, under sterile conditions, equidistantly spaced from one another, onto the mushroom-growing surface of the culture medium. The cultivation was further continued at 25° C for 27 days. Hyphae located directly below the coating material on the mushroom-growing surface were not browned but stayed white, but hyphae in other portions were browned. After the cultivation, a low temperature treatment was carried out at 15° C for 3 days. At this point, formation of mushroom rudiments only from hyphae below the coating material was observed. The coating material was removed. After the passage of another 5 days, complete fruit bodies of *Lentinus edodes* were formed. The quantity of the thus-formed fruit bodies is shown in Table 2. In Table 2, the comparative run refers to a run in which the same operations were conducted except that a coating material was not applied.

With respect to each run of the present invention and the comparative runs, the cultivation was simultaneously conducted on 5 culture media.

The air permeability generally includes those of oxygen, carbon dioxide and nitrogen. In accordance with this invention, oxygen permeability is preferred to be 200 to 5000 cc/m$^2$·24hr.·atm at 25° C and carbon dioxide permeability, 1000 to 15,000 cc/m$^2$·24hr.·atm at 25° C. Nitrogen gas has no influence on the grouth of fruit bodies.

The embodiments of the invention in which an exclusive property or privilege is claimed are as follows:

1. A method for artificially cultivating *Lentinus edodes* by using an artificial solid granular or fibrous culture medium, which comprises inoculating a sterilized bed of said culture medium with fungus seed of *Lentinus edodes*, cultivating said bed to generate hyphae of *Lentinus edodes* on the surface of said bed, applying an air-permeable but essentially imperforate film or film pieces of a coating material which is not decomposed by hyphae of *Lentinus edodes* to localized areas of said surface of said bed before said hyphae become brown so that said areas are contacted by said film or film pieces to prevent ambient air from directly contacting said areas while permitting air to permeate through the film or film pieces into contact with said areas, continuing the cultivation of said bed to cause browning of exposed hyphae while the hyphae directly below said pieces of coating material remain white, then subjecting the bed to mushroom-growing conditions effective to form fruit bodies of *Lentinus edodes* which grow from the hyphae below said pieces of coating material.

2. A method for artificially cultivating *Lentinus edodes* according to claim 1 wherein said coating material is a synthetic resin film having a thickness of 20 to 200 $\mu$.

3. A method for artificially cultivating *Lentinus edodes* according to claim 1 wherein the coating material is a polyethylene film, a polyvinyl chloride film, a polypropylene film, a polycarbonate film or a polystyrene film.

4. A method for artificially cultivating *Lentinus edodes* according to claim 1 wherein the culture medium is a solid culture medium containing at least one member selected from the group consisting of sawdust, bagasse, rice hulls, rice bran and wheat bran.

5. A method according to claim 1 in which said coating material is applied to said bed before inoculation of said bed.

6. A method according to claim 1 in which said coating material is applied to said bed within about 20 days after inoculation of said bed.

7. A method according to claim 1 in which said localized areas have at least one dimension not larger than about 3 cm.

8. A method according to claim 1 in which the bed is cultivated at about 25° C for a total of about 40 to 70 days and then said bed is subjected to mushroom-growing conditions at a temperature of about 15° to 20° C for about 6 to 9 days to form the fruit bodies.

* * * * *

Table 2

| | Culture Medium No. | Number of Fruit Bodies Formed | Total Amount (g) of Fruit Bodies Formed |
|---|---|---|---|
| Runs of Present Invention | 1 | 9 | 160 |
| | 2 | 13 | 178 |
| | 3 | 11 | 165 |
| | 4 | 10 | 159 |
| | 5 | 8 | 162 |
| Comparative Runs | 1 | 0 | 0 |
| | 2 | 0 | 0 |
| | 3 | 0 | 0 |
| | 4 | 0 | 0 |
| | 5 | 0 | 0 |